(12) United States Patent
Nishino et al.

(10) Patent No.: US 12,472,780 B2
(45) Date of Patent: Nov. 18, 2025

(54) TIRE

(71) Applicant: Sumitomo Rubber Industries, Ltd., Kobe (JP)

(72) Inventors: Mitsuhiro Nishino, Kobe (JP); Koichi Nakajima, Kobe (JP); Yoshifumi Kawagoe, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 232 days.

(21) Appl. No.: 18/105,654

(22) Filed: Feb. 3, 2023

(65) Prior Publication Data

US 2023/0271457 A1 Aug. 31, 2023

(30) Foreign Application Priority Data

Feb. 25, 2022 (JP) ................................. 2022-027774

(51) Int. Cl.
| | |
|---|---|
| *B60C 11/13* | (2006.01) |
| *B60C 11/03* | (2006.01) |
| *B60C 11/12* | (2006.01) |

(52) U.S. Cl.
CPC ...... *B60C 11/1353* (2013.01); *B60C 11/0302* (2013.01); *B60C 11/0304* (2013.01); *B60C 11/1236* (2013.01); *B60C 11/1281* (2013.01); *B60C 2011/0353* (2013.01); *B60C 2011/0365* (2013.01); *B60C 2011/0367* (2013.01); *B60C 2011/1361* (2013.01)

(58) Field of Classification Search
CPC ......... B60C 11/1353; B60C 2011/1361; B60C 2011/0341; B60C 11/047
See application file for complete search history.

(56) References Cited

U.S. PATENT DOCUMENTS

| | | | |
|---|---|---|---|
| 2011/0146863 | A1 | 6/2011 | Ochi |
| 2013/0088520 | A1 | 4/2013 | Kato |
| 2019/0232726 | A1 | 8/2019 | Lutz et al. |

(Continued)

FOREIGN PATENT DOCUMENTS

| | | |
|---|---|---|
| CN | 109414962 A | 3/2019 |
| JP | 6-239107 A | 8/1994 |

(Continued)

OTHER PUBLICATIONS

JP 2006056480 Machine Translation (Year: 2006).*

(Continued)

*Primary Examiner* — Blaine Copenheaver
*Assistant Examiner* — Wendy L Boss
(74) *Attorney, Agent, or Firm* — Birch, Stewart, Kolasch & Birch, LLP

(57) ABSTRACT

A tire includes a tread portion including at least one circumferential groove extending continuously in a tire circumferential direction. The at least one circumferential groove includes a groove bottom having a plurality of protrusions projecting in a tire radial direction. Each of the plurality of protrusions has a longitudinally elongated shape with a width in a tire axial direction and a length in the tire circumferential direction that is greater than the width. Each of the plurality of protrusions includes a tapered portion whose width decreases in the tire circumferential direction.

13 Claims, 7 Drawing Sheets

(56) References Cited

U.S. PATENT DOCUMENTS

2020/0376900 A1    12/2020    Yamaoka et al.
2021/0178826 A1    6/2021    Lutz et al.

FOREIGN PATENT DOCUMENTS

JP          2006056480 A   *   3/2006  ........... B60C 11/047
JP          2020-196281 A     12/2020

OTHER PUBLICATIONS

JP H06239107 Machine Translation (Year: 1994).*
JP 2014-031107 machine translation (Year: 2014).*
Extended European Search Report for European Application No. 23152575.9, dated Jun. 26, 2023.

* cited by examiner

TIRE

RELATED APPLICATIONS

This application claims the benefit of foreign priority to Japanese Patent Application No. JP2022-027774, filed Feb. 25, 2022, which is incorporated by reference in its entirety.

FIELD OF THE DISCLOSURE

The present disclosure relates to a tire.

BACKGROUND OF THE DISCLOSURE

Patent Document 1 below has proposed a tire that includes a main groove extending continuously in the tire circumferential direction with a groove bottom provided with a plurality of protrusions. The tire is expected to improve traction performance and braking performance on snow by forming a snow column in the main groove and making the protrusions bite into the snow column when running on snow.

PATENT DOCUMENT

[Patent document 1] Japanese Unexamined Patent Application Publication 2020-196281

SUMMARY OF THE DISCLOSURE

As vehicles have become quieter in recent years, tires are also required to have better noise performance.

The present disclosure has been made in view of the above circumstances and has a major object to provide a tire that can exhibit excellent noise performance while maintaining wet performance.

In one aspect of the present disclosure, a tire includes a tread portion including at least one circumferential groove extending continuously in a tire circumferential direction. The at least one circumferential groove includes a groove bottom having a plurality of protrusions projecting in a tire radial direction. Each of the plurality of protrusions has a longitudinally elongated shape with a width in a tire axial direction and a length in the tire circumferential direction that is greater than the width. Each of the plurality of protrusions includes a tapered portion whose width decreases in the tire circumferential direction.

DETAILED DESCRIPTION OF THE DISCLOSURE

One or more embodiments of the present disclosure will be described below with reference to the drawings.

Figure 1:
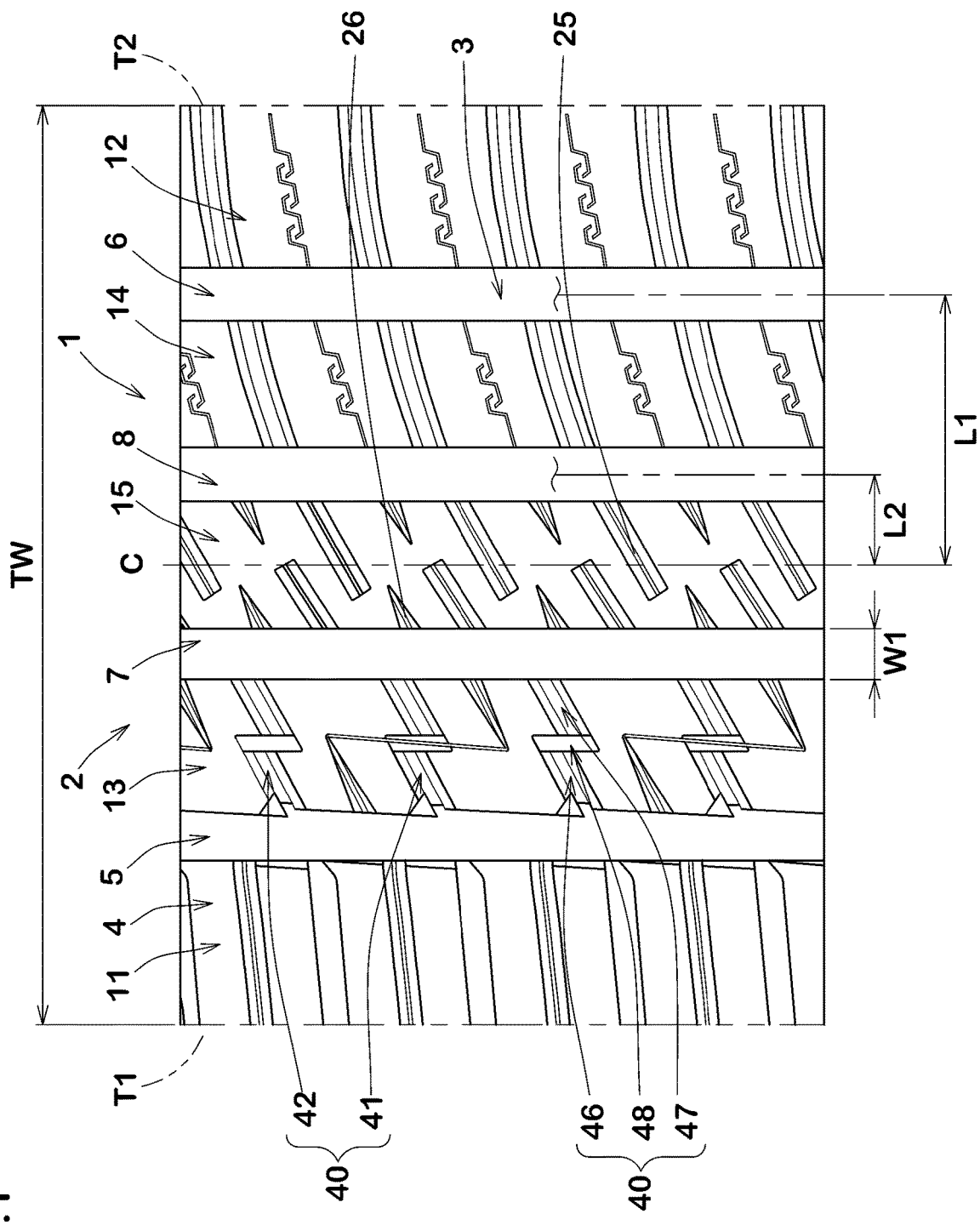
FIG. 1 is a development view of a tread portion showing an embodiment of the present disclosure.

FIG. 1 is a development view of a tread portion 2 of a tire 1 showing an embodiment of the present disclosure. The tire 1 according to the present embodiment, for example, is embodied as a winter tire and may be suitably used as a pneumatic tire for passenger cars. However, the present disclosure is not limited to such an embodiment, and may be applied to heavy-duty pneumatic tires and non-pneumatic tires in which the interior of the tire is not filled with pressurized air.

As illustrated in FIG. 1, the tread portion 2 according to the present disclosure includes a first tread edge T1, a second tread edge T2, a plurality of circumferential grooves 3 extending continuously in the tire circumferential direction between the first tread edge T1 and the second tread edge T2, and a plurality of land portions 4 divided by the circumferential grooves 3. As a preferred embodiment, the tire 1 according to the present embodiment is configured as a so-called five-rib tire in which the tread portion 2 is composed of four circumferential grooves 3 and five land portions 4.

In the present embodiment, the tread portion 2, for example, has a designated mounting direction on a vehicle. Thus, the first tread edge T1 is intended to be positioned outside the vehicle when installed, and the second tread edge T2 is intended to be positioned inside the vehicle when installed. The mounting direction on a vehicle is indicated, for example, by letters or symbols on a sidewall portion (not illustrated) of the tire 1. However, the tire 1 according to the present disclosure is not limited to such an embodiment and may be used without specifying the mounting direction on a vehicle.

The first tread edge T1 and the second tread edge T2 are the axial outermost edges of the ground contacting patch of the tire 1 which occurs under the condition such that the tire 1 under a normal state is grounded on a plane by zero camber angles with 70% of a standard tire load.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, the dimensions of portions of the tire are values measured under the normal state. Further, in this specification, unless otherwise specified, known methods can be appropriately applied to the methods for measuring the dimensions and composition of materials.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. Also, in the case of tires for which various standards are not specified, "standard tire load" refers to the maximum load that can be applied when using the tire according to the above-mentioned standards.

The circumferential grooves 3 include a first crown circumferential groove 7. The first crown circumferential groove 7 is located on the first tread edge T1 side with respect to the tire equator C. Further, in the present embodiment, the circumferential grooves 3 include a second crown circumferential groove 8, a first shoulder circumferential groove 5 and a second shoulder circumferential groove 6. The second crown circumferential groove 8 is located on the second tread edge T2 side with respect to the tire equator C. The first shoulder circumferential groove 5 is located between the first crown circumferential groove 7 and the first tread edge T1. The second shoulder circumferential groove 6 is located between the second crown circumferential groove 8 and the second tread edge T2.

Preferably, a distance L1 in the tire axial direction from the tire equator C to the groove centerline of the first shoulder circumferential groove 5 or the second shoulder circumferential groove 6 is, for example, in a range from 25% to 35% of the tread width TW. Preferably, a distance L2 in the tire axial direction from the tire equator C to the groove centerline of the first crown circumferential groove 7 or the second crown circumferential groove 8 is, for example, in a range from 5% to 15% of the tread width TW. Note that the tread width TW is the distance from the first tread edge T1 to the second tread edge T2 in the tire axial direction under the normal state.

In the present embodiment, the first crown circumferential groove 7, the second crown circumferential groove 8 and the second shoulder circumferential groove 6 each extend in a straight manner in parallel with the tire circumferential direction. On the other hand, the first shoulder circumferential groove 5 has a zigzag groove edge on the tire equator C side. However, each of the circumferential grooves 3 is not limited to such a shape.

The circumferential grooves 3 have a groove width W1 which is preferably equal to or more than 3 mm. In addition, the groove width W1 of the circumferential grooves 3, for example, is preferably in a range from 3.0% to 7.0% of the tread width TW. A groove depth of the circumferential grooves 3 is in a range from 5 to 10 mm for passenger car tires, for example.

In the present embodiment, the land portions 4 include a crown land portion 15. The crown land portion 15 is sectioned between the first crown circumferential groove 7 and the second crown circumferential groove 8 and is located on the tire equator C. Thus, the first crown circumferential groove 7 is adjacent to the crown land portion 15 on the first tread edge T1 side. Further, the land portions 4 according to the present embodiment include a first middle land portion 13, a second middle land portion 14, a first shoulder land portion 11 and a second shoulder land portion 12. The first middle land portion 13 is sectioned between the first shoulder circumferential groove 5 and the first crown circumferential groove 7. The second middle land portion 14 is sectioned between the second shoulder circumferential groove 6 and the second crown circumferential groove 8. The first shoulder land portion 11 includes the first tread edge T1 and is located outwardly in the tire axial direction of the first shoulder circumferential groove 5. The second shoulder land portion 12 includes the second tread edge T2 and is located outwardly in the tire axial direction of the second shoulder circumferential groove 6.

Figure 2:
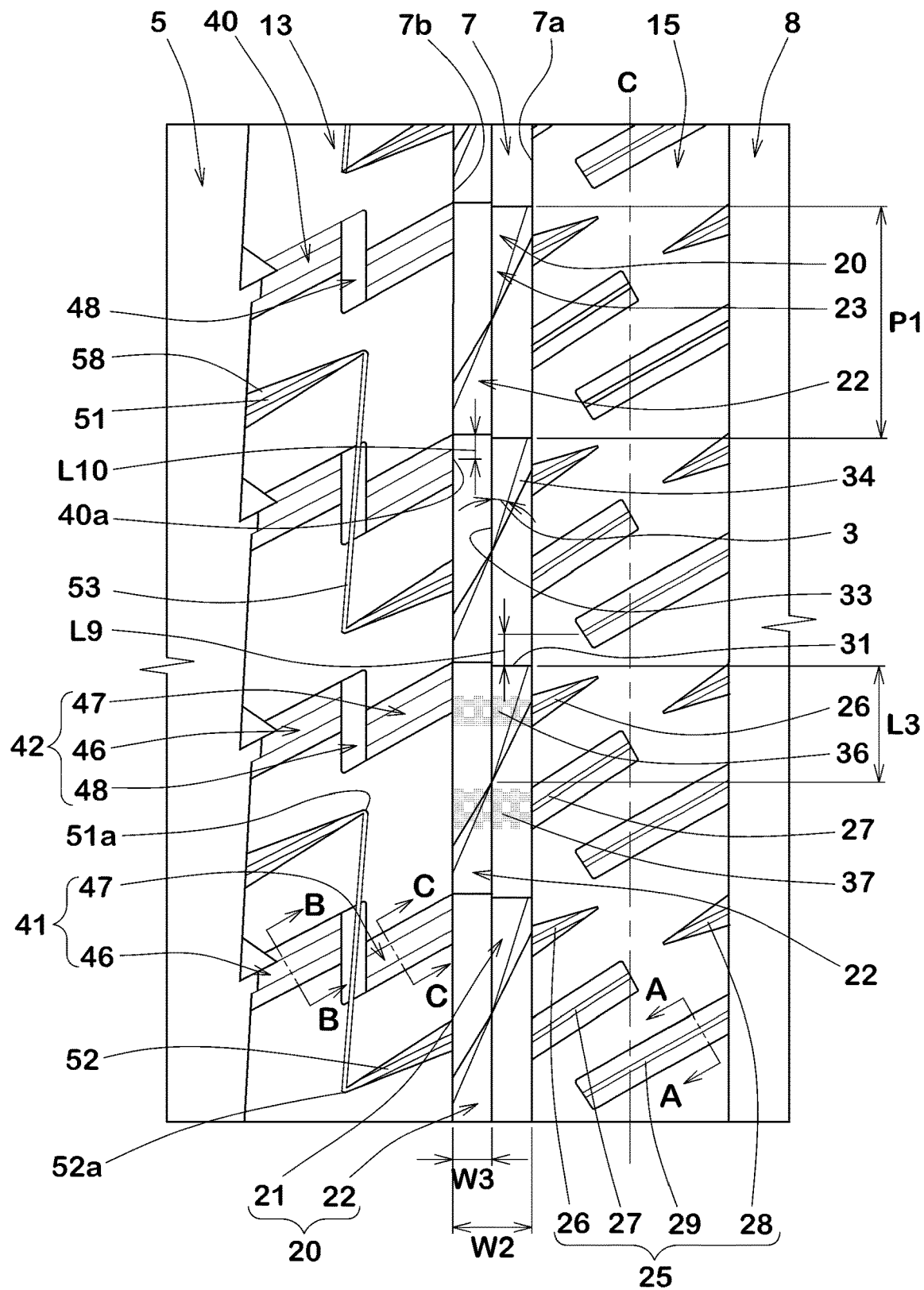
FIG. 2 is an enlarged view of a crown land portion, a first middle land portion and a first crown circumferential groove of FIG. 1.
Figure 3:
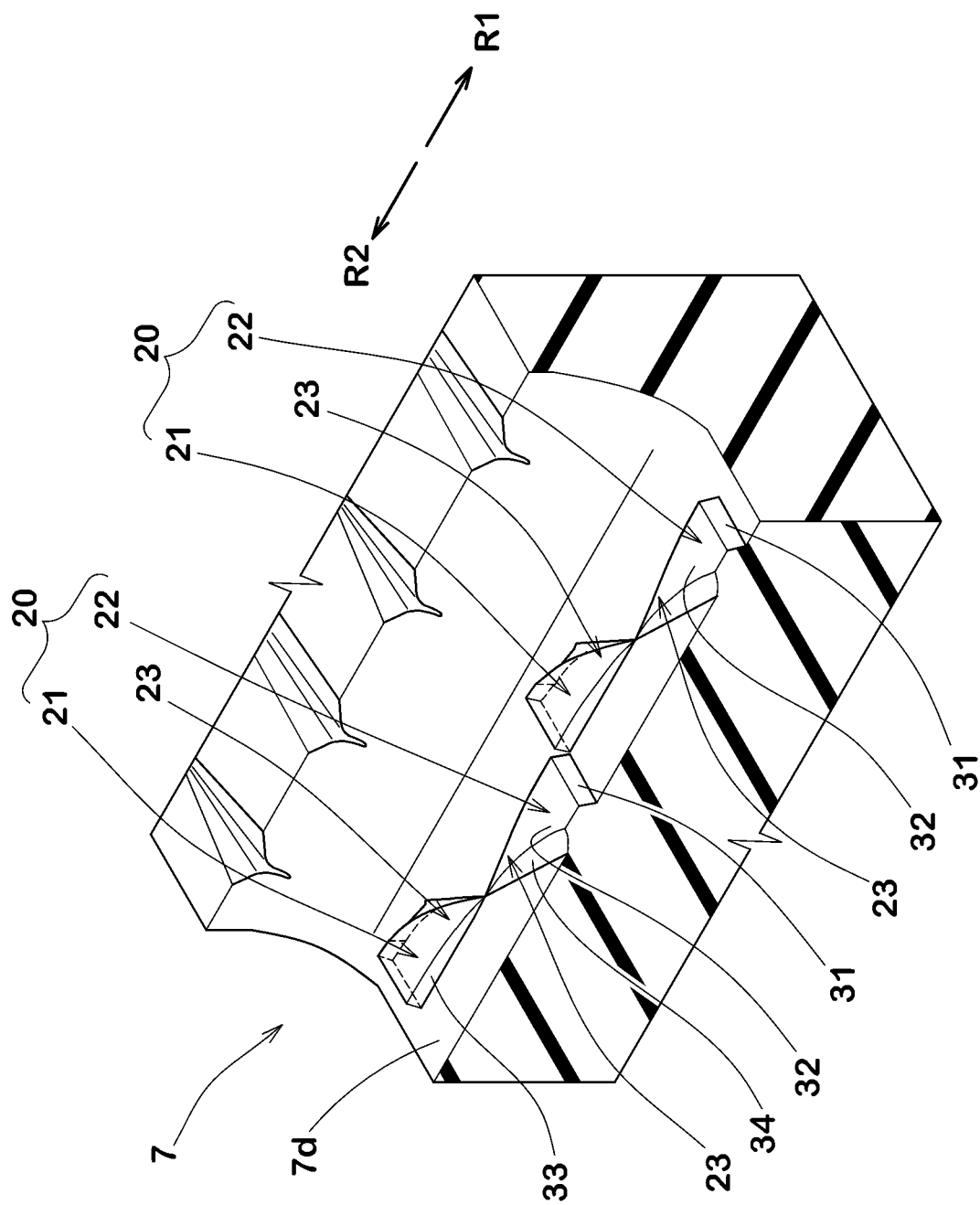
FIG. 3 is an enlarged perspective view of the first crown circumferential groove.

FIG. 2 illustrates an enlarged view of the crown land portion 15, the first middle land portion 13 and the first crown circumferential groove 7. FIG. 3 illustrates an enlarged perspective view of a groove bottom 7d of the first crown circumferential groove 7. As illustrated in FIG. 2 and FIG. 3, the groove bottom 7d of the first crown circumferential groove 7 is provided with a plurality of protrusions 20 projecting in the tire radial direction. In FIG. 2, the outlines of the protrusions 20 that can be observed in a tread plan view is conceptually shown as a solid line, but in FIG. 1, these outlines are omitted. As a preferable aspect, in the present embodiment, the protrusions 20 are provided only on the first crown circumferential groove 7, but the present disclosure is not limited to such an aspect, and the other circumferential grooves 3 may be provided with the protrusions 20.

The tire 1 according to the present disclosure can exhibit a large reaction force by making the protrusions 20 bite into the snow column formed in the at least one circumferential groove 3 when driving on snow and can exhibit excellent traction performance and braking performance on snow.

As illustrated in FIG. 3, each of the plurality of protrusions 20 has a longitudinally elongated shape with a width in a tire axial direction and a length in the tire circumferential direction that is greater than the width. In addition, each of the plurality of protrusions 20 includes a tapered portion 23 whose width decreases in the tire circumferential direction. By adopting the above configuration, the tire 1 according to the present disclosure can exhibit excellent noise performance while maintaining wet performance. The following mechanisms can be inferred as the reasons for this.

In the tire according to the present disclosure, the protrusions 20 are provided on the groove bottom of the circumferential groove 3 (in this embodiment, the first crown circumferential groove 7), so that air passing through the circumferential groove is easily disturbed by hitting the protrusions 20 when driving on a dry road. Further, the velocity of the disturbed air changes significantly when it passes through the vicinity of the taper portions 23. Specifically, when the width of the tapered portions 23 becomes large toward the direction of air flow direction, the air movement speed tends to decrease, and when the width of the tapered portions 23 becomes small toward the direction of air flow, the air movement speed tends to increase. Such an action can further promote air disturbance in the circumferential groove so as to suppress the generation of standing waves in the circumferential groove, thereby reducing air column resonance.

In addition, the tapered portions 23 can suppress a decrease in the groove volume of the circumferential groove due to the protrusions 20, and can maintain wet performance. The tire 1 according to the present can improve noise performance while wet performance by such a mechanism.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

As illustrated in FIG. 2, the first crown circumferential groove 7 includes a first groove wall 7a and a second groove wall 7b. The first groove wall 7a is the groove wall located on the crown land portion 15 side, and the second groove wall 7b is the groove wall located on the first middle land portion 13 side. The protrusions 20 include a plurality of first protrusions 21 arranged on the first groove wall 7a side and a plurality of second protrusions 22 arranged on the second groove wall 7b side. The first protrusions 21 and the second protrusions 22 have substantially the same configuration, except that they are arranged in different directions. The first protrusions 21 are arranged at a constant pitch P1 in the tire circumferential direction. Similarly, the second protrusions 22 are arranged at a constant pitch P1 in the tire circumferential direction.

Each of the protrusions 20 has the maximum width W3 in the tire axial direction, for example, ranging from 30% to 70% of the maximum groove width W2 of the first crown circumferential groove 7. If, as in the present embodiment, the first crown circumferential groove 7 includes the first protrusions 21 and the second protrusions 22, each protrusion 20 has a width W3 ranging from 30% to 50% of the groove width W2, preferably 40% to 50%.

For example, a length L3 in the tire circumferential direction of each protrusion 20 ranges from 40% to 60% of the circumferential pitch P1 of the protrusions 20. Further, the length L3 in the tire circumferential direction of each protrusion 20 ranges from 2.0 to 4.0 times the width W3 of the protrusion 20, for example. These protrusions 20 have sufficient rigidity in the tire circumferential direction and can provide a large reaction force when shearing the snow column in the first crown circumferential groove 7 during driving on snow. However, the protrusions 20 are not limited to such an embodiment.

Figure 4:
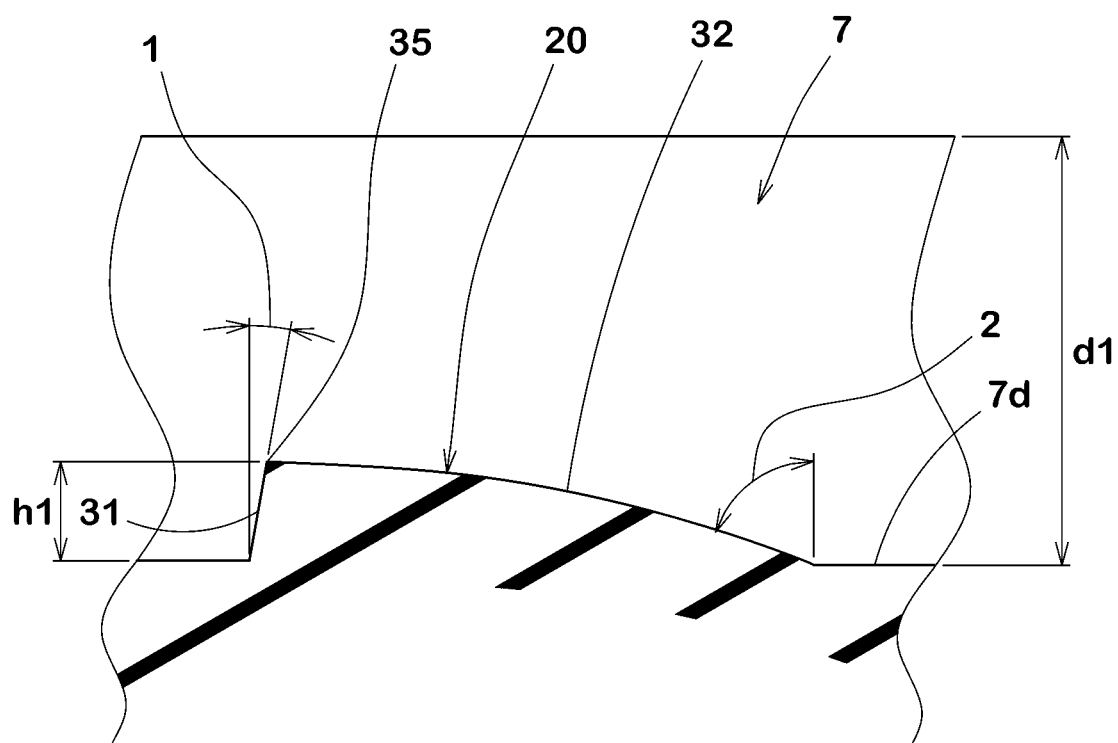
FIG. 4 is an enlarged cross-sectional view of a protrusion.

FIG. 4 illustrates an enlarged cross-sectional view of one protrusion 20 along a longitudinal direction of the first crown circumferential groove 7. As illustrated in FIG. 4, the maximum height h1 in the tire radial direction of the protrusions 20 is, for example, equal to or less than 20%, preferably from 10% to 20%, of the maximum groove depth d1 of the first crown circumferential groove 7. The protrusions 20 as such can exert the above-mentioned effect while maintaining the drainage of the first crown circumferential groove 7.

Each protrusion 20 includes a first surface 31 facing one side in the tire circumferential direction and extending in the tire radial direction, and a second surface 32 located on the opposite side of the first surface 31. An angle θ1 of the first surface 31 with respect to the tire radial direction is, for example, equal to or less than 15 degrees, preferably equal to or less than 10 degrees. The second surface 32 is connected to the first surface 31 by a ridge line 35, for example, and extends from the ridge line 35 to the groove bottom 7d of the first crown circumferential groove 7 at a gradual slope. The second surface 32 in the present embodiment, for example, is slightly curved in the direction convex toward outwardly in the tire radial direction, but it can also be a plane. As used herein, "ridge line" means a connection formed by two surfaces with different extension directions, and having a longitudinal direction. Further, "ridge line" also includes those having a substantial width by constituting a micro-curved surface in its transverse section.

The second surface 32 has an angle with respect to the tire radial direction larger than that of the first surface 31. At an end of the second surface 32 on the groove bottom 7d side, an angle θ2 of the second surface 32 with respect to the tire radial direction is, for example, equal to or more than 70 degrees, preferably from 78 to 86 degrees. The protrusions 20 including the first surfaces 31 and the second surfaces 32 can exert a large reaction force when the first surfaces 31 push the snow column away when driving on snow.

As illustrated in FIG. 2, in a tread plan view, each tapered portion 23 is formed between a first side surface 33 extending along the tire circumferential direction and a second side surface 34 inclined at a larger angle than that of the first side surface 33 with respect to the tire circumferential direction. The first side surface 33 and the second side surface 34, for example, are connected to the second surface 32 via respective ridge lines and extend in the tire radial direction. Further, the first side surface 33 and the second side surface 34 are connected to the first surface 31 via respective ridge lines that extend in the tire radial direction. In the present embodiment, the first side surface 33 is located on a groove centerline side of the first crown circumferential groove 7 with respect to the second side surface 34. Thus, the region of the first surface 31 on the groove centerline side is less likely to deform in the tire circumferential direction, and the above effects can be further improved.

In a tread plan view, an angle θ3 between the first side surface 33 and the second side surface 34 is, for example, equal to or less than 30 degrees, preferably ranging from 15 to 25 degrees. The first side surface 33 and the second side surface 34, which are arranged at such an angle, can help to improve on-snow performance, as well as to improve wet performance and noise performance in a well-balanced manner. Note that the angle θ3 is defined as the maximum angle between the ridge line formed between the first side surface 33 and the second surface 32 and the ridge line formed between the second side surface 34 and the second surface 32.

As illustrated in FIGS. 2 and 3, in a tread plan view, the first protrusions 21 are oriented such that the second protrusions 22 are rotated by 180 degrees. The width of the tapered portion 23 of each first protrusion 21 becomes smaller toward a first direction R1 in the tire circumferential direction to form a tip end. Further, the first surface 31 of each first protrusion 21 faces the second side R2 that is opposite to the first direction R1 in the tire circumferential direction. The second surface 32 of each first protrusion 21 is connected to the first surface 31 on the first direction R1 side.

On the other hand, the width of the tapered portion 23 of each second protrusion 22 becomes smaller toward the second direction R2 to form a tip end. The first surface 31 of each second protrusion 22 faces the first direction R1. The second surface 32 of each second protrusion 22 is connected to the first surface 31 on the second direction R2 side. Further, in the present embodiment, tip ends of the tapered portions 23 of the plurality of first protrusions 21 are in contact with respective tip ends of the tapered portions 23 of the plurality of second protrusions 22. By such an arrangement of the first protrusions 21 and the second protrusions 22, in the case where the protrusions 20 shear the snow pillars compressed in the first crown circumferential groove 7 in the tire circumferential direction when driving on snow, the first protrusions 21 can provide a large reaction force on one side in the tire circumferential direction, and the second protrusions 22 can provide a large reaction force on the other side in the tire circumferential direction. Thus, traction performance and braking performance on snow can be improved in a well-balanced manner.

In some preferred embodiments, the first protrusions 21 and the second protrusions 22 are staggered in the tire circumferential direction. Specifically, in a tread plan view as illustrated in FIG. 2, respective lengths of overlap between imaginary areas in which the first protrusions 21 are extended in parallel with the tire axial direction and the respective second protrusions 22 are equal to or less than 20% of the respective lengths of the second protrusions 22 in the tire circumferential direction, more preferably equal to or less than 10%. In some more preferred embodiments, the imaginary areas and the respective second protrusions 22 do not overlap with each other in the tire circumferential direction. This arrangement of the protrusions 20 can prevent snow from clogging in the first crown circumferential groove 7 when driving on snow, and help to sustain excellent snow performance.

In the present embodiment, the above-mentioned protrusions 20 are provided on only the first crown circumferential groove 7. That is, the second crown circumferential crown groove 8 (shown in FIG. 1) preferably has a flat groove bottom where no protrusions are provided. Similarly, the groove bottoms of the first shoulder circumferential groove 5 and the second shoulder circumferential groove 6 (shown in FIG. 1) preferably have a flat shape without having the protrusions 20 described above. This structure may improve wet performance of the tire. Alternatively, the present disclosure is not limited to such an embodiment, and from the viewpoint of further improving on-snow performance, the protrusions 20 described above may be provided in the circumferential grooves 3 other than the first crown circumferential groove 7.

As illustrated in FIG. 2, no drainage grooves are provided on the crown land portion 15. As used herein, "drainage groove" is a groove that can provide substantial drainage effect and whose opening width at the ground contact surface of the tread portion exceeds 2.0 mm. Further, "drainage groove" is a groove that has a depth (the length in the tire radial direction) exceeds 2.0 mm of the area where the distance between two opposite groove walls exceeds 2.0 mm. On the other hand, the crown land portion 15 has a plurality of sipes 25.

As used herein, "sipe" means a groove-shaped body (a longitudinal recess, including a groove and a sipe) having a small width, and a main body portion thereof has a width between two opposite inner walls being 1.5 mm or less. Further, the main body portion means a portion in which two opposite inner walls extend substantially parallel to each other in the tire radial direction. In some preferred embodiments, the main body potion has a width, for example, in a range from 0.5 to 1.0 mm. As will be described later, the sipe may be provided with one or more chamfered portions. Alternatively, the sipe may have a so-called flask bottom with an increased width at the bottom.

In the present embodiment, since the crown land portion 15 has no drainage grooves as mentioned above, the crown land portion 15 has high rigidity. Further, since such a crown land portion 15 having high rigidity is adjacent to the circumferential groove with the protrusions 20, when driving on snow, the snow column in the circumferential groove adjacent to the crown land portion 15 can be strongly pressed and solidified, and the reaction force can be further increased. On the other hand, the crown land portion 15 is provided with the sipes 25, which can improve on-snow performance.

The sipes 25 (hereinafter may be referred to as crown sipes 25) on the crown land portion 15 include, for example, first crown sipes 26, second crown sipes 27, third crown sipes 28 and fourth crown sipes 29.

Figure 5:
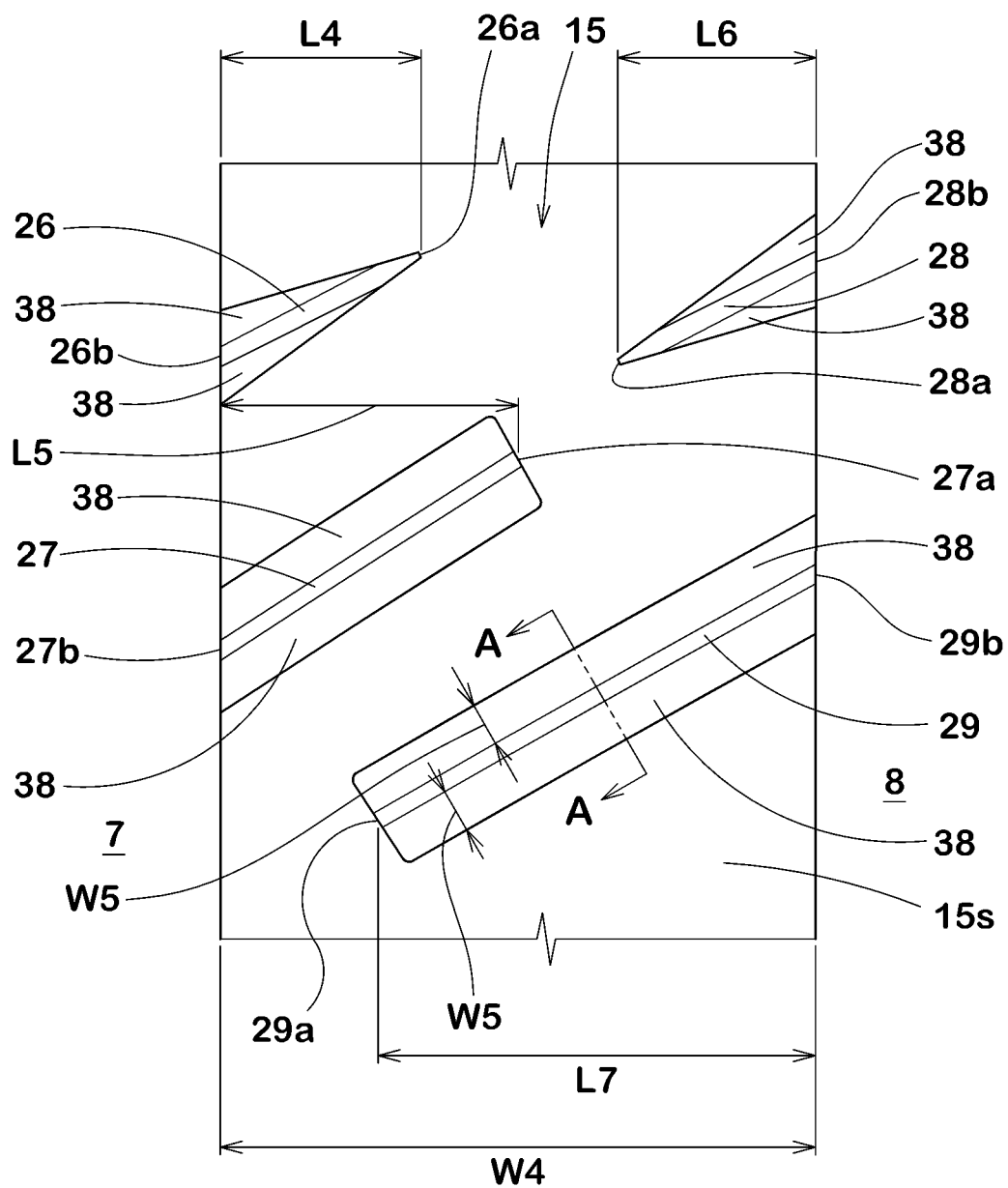
FIG. 5 is an enlarged view of a first crown sipe, a second crown sipe, a third crown sipe and a fourth crown sipe of FIG. 2.

FIG. 5 illustrates an enlarged view of one of the first crown sipes 26, one of the second crown sipes 27, one of the third crown sipes 28 and one of the fourth crown sipes of FIG. 2. As illustrated in FIG. 5, the first crown sipes 26 and the second crown sipes 27 have opening ends 26b and 27b, respectively, connected to the first crown circumferential groove 7 (shown in FIG. 2) and closed ends 26a and 27a, respectively, in the ground contact surface of the crown land portion 15. The third crown sipes 28 and the fourth crown sipes 29, for example, have opening ends 28b and 29b, respectively, connected to the second crown circumferential groove 8 (shown in FIG. 2) and closed ends 28a and 29a, respectively, in the ground contact surface of the crown land portion 15. These crown sipes 25 can provide friction force on snow surfaces while maintaining the rigidity of the crown land portion 15. Thus, the balance between steering stability and on-snow performance can be improved.

Figure 6:
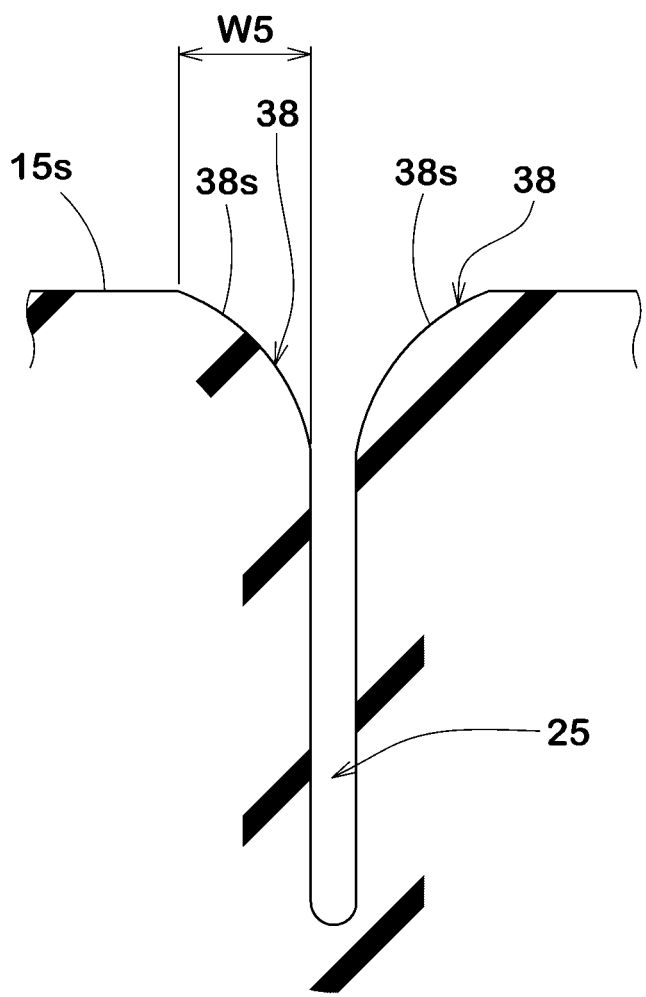
FIG. 6 is a cross-sectional view taken along the line A-A of FIG. 5.

As a figure showing a cross section of one crown sipe 25, FIG. 6 illustrates a cross-sectional view taken along the line A-A of FIG. 5. As illustrated in FIG. 6, each crown sipe 25 is open at the ground contact surface 15s with one or more chamfer portions 38. Each chamfer portion 38 includes an inclined surface 38s between the ground contact surface 15s and the sipe wall. In the present embodiment, the inclined surface 38s is slightly curved in a direction convex outward in the tire radial direction. The inclined surface 38s may, for example, be planar. The chamfer portion 38 can equalize the ground contact pressure acting on the ground contact surface of the land portion and help improve steering stability and uneven wear resistance.

As illustrated in FIG. 5, it is preferable that the chamfer portion 38 of each first crown sipe 26 has a chamfer width decreasing toward the closed end 26a of the first crown sipe 26. Similarly, the chamfer portion 38 of each third crown sipe 28 has a chamfer width decreasing toward the closed end 28a of the third crown sipe 28. Thus, the first crown sipes 26 and the third crown sipes 28 can secure a sufficient ground contact area in the central area of the crown land portion 15, and can reliably maintain steering stability. In the first crown sipes 26 of the present embodiment, each chamfer portion 38 is substantially eliminated at the closed end 26a, but each chamfer portion 38 is not limited to such an aspect, and one or more chamfer portions 38 may have a chamfer width at the closed ends 26a. The same is true for the third crown sipes 28. As illustrated in FIGS. 5 and 6, a chamfer width W5 is the width measured perpendicular to the longitudinal direction of the sipe in a tread plan view.

Preferably, the second crown sipes 27 and the fourth crown sipes 29 are provided with chamfer portions 38 over the entire respective sipe lengths. More preferably, a pair of chamfer portions 38 of each second crown sipe 27 has a constant chamfer width in the longitudinal direction of the second crown sipe 27. Similarly, it is preferable that a pair of chamfer portions 38 of each fourth crown sipe 29 has a constant chamfer width in the longitudinal direction of the fourth crown sipe 29. In addition, the chamfer width of the chamfer portions 38 of each fourth crown sipe 29 ranges 80% to 120% of the chamfer width of the chamfer portions 38 of each second crown sipe 27, and in this embodiment, they are substantially the same with each other. The second crown sipes 27 and the fourth crown sipes 29 can help to suppress uneven wear of the crown land portion 15.

In a tread plan view as illustrated in FIG. 2, it is preferable that at least one of the protrusions 20 (e.g., plural first protrusions 21) overlaps, at least partially, either one of areas 36 (a dotted area 36 in FIG. 2.) in which the opening ends 26b with the chamfer portions 38 of the first crown sipes 26 are virtually extended in parallel with the tire axial direction into the first crown circumferential groove 7. As a more preferred embodiment, in the present embodiment, the first protrusions 21 overlap so as to straddle the respective areas 36 in a tread plan view. This structure allows the first protrusions 21 to increase the rigidity around the first crown sipes 26, improving steering stability.

From the same point of view, it is also preferable that at least one of the protrusions 20 (e.g., plural second protrusions 22) overlaps, at least partially, either one of areas 37 (a dotted area 37 in FIG. 2.) in which the opening ends with the chamfer portions 38 of the second crown sipes 27 are virtually extended in parallel with the tire axial direction into the first crown circumferential groove 7.

In the present embodiment, the first protrusions 21 and the second protrusions 22 are staggered in the tire circumferential direction such that in a tread plan view, the areas 36 overlap with the respective first protrusions 21, but does not overlap with the respective second protrusions 22. Similarly, the areas 37 overlap with the respective second protrusions 22, but not with the respective first protrusions 21. This structure can improve steering stability of the tire while maintaining wet performance.

As illustrated in FIG. 5, these crown sipes 25 are inclined in the same direction with respect to the tire axial direction. An angle of the crown sipes 25, for example, ranges from 10 to 50 degrees, preferably from 20 to 40 degrees, with respect to the tire axial direction. Note that an angle and a length of the sipes are measured at the centerline of the respective sipes.

A length L4 in the tire axial direction of the first crown sipes 26 is smaller than a length L7 in the tire axial direction of the fourth crown sipes 29 and smaller than a length L5 in the tire axial direction of the second crown sipes 27. In addition, the closed ends 26a of the first crown sipes 26 are located on the first crown circumferential groove 7 side (left side in FIG. 5) with respect to the closed ends 28a of the third crown sipes 28. In some more preferred embodiments, the closed ends 26a of the first crown sipes 26 are located on the second crown circumferential groove 8 side (right side in FIG. 5) with respect to the closed ends 29a of the fourth crown sipes 29. Preferably, the length L4 of the first crown sipes 26 ranges from 25% to 45% of a width W4 in the tire axial direction of the ground contact surface 15s of the crown land portion 15. The first crown sipes 26 as such can help to balance steering stability with on-snow performance and wet performance.

The length L5 in the tire axial direction of the second crown sipes 27, for example, ranges from 40% to 60% of the width W4 in the tire axial direction of the ground contact surface 15s of the crown land portion 15.

A length L6 in the tire axial direction of the third crown sipes 28, for example, is smaller than the length L7 of the fourth crown sipes 29 and smaller than the length L5 of the second crown sipes 27. Specifically, the length L6 of the third crown sipes 28 preferably ranges from 25% to 45% of the width W4 in the tire axial direction of the ground contact surface 15s of the crown land portion 15.

Preferably, the fourth crown sipes 29 extend beyond the axial center in the tire axial direction of the ground contact surface 15s of the crown land portion 15. The fourth crown sipes 29 have the closed ends 29a which are located on the first crown circumferential groove 7 side with respect to the closed ends 27a of the second crown sipes 27. Preferably, the length L7 in the tire axial direction of the fourth crown sipes 29 is greater than the length L5 in the tire axial direction of the second crown sipes 27. Specifically, the length L7 of the fourth crown sipes 29 preferably ranges from 65% to 85% of the width W4 in the tire axial direction of the ground contact surface 15s of the crown land portion 15. The fourth crown sipes 29 as such can improve on-snow performance and wet performance while maintaining steering stability.

As illustrated in FIG. 2, a distance L9 in the tire circumferential direction from center locations in the tire axial direction of the first surfaces 31 of the first protrusions 21 to the respective closed ends 29a of the fourth crown sipes 29 (shown in FIG. 5) preferably ranges from 15% to 30% of the circumferential pitch P1 of the protrusions 20. Due to such an arrangement of the fourth crown sipes 29 in this way, a part of the land portion around the first surfaces 31 becomes moderately deformable. Thus, areas around the first surfaces 31 are less likely to be clogged with snow, and excellent on-snow performance can be maintained.

The first middle land portion 13 is provided with a plurality of middle lateral grooves 40. The middle lateral grooves 40, for example, extend to traverse the first middle land portion 13 completely in the tire axial direction.

In a tread plan view, it is preferable that at least one of the plurality of protrusions 20 (the first protrusions 21 in the embodiment) overlaps either one of areas in which the opening ends 40a of the middle lateral grooves 40 are virtually extended in parallel with the tire axial direction into the first crown circumferential groove 7. Due to the positional relationship between the protrusions 20 and the middle lateral grooves 40, the air that is disturbed by the protrusions 20 can easily flow into the middle lateral grooves 40. Such an action can help to reduce the air column resonance noise in the first crown circumferential groove 7 to improve noise performance.

Preferably, the opening ends 40a of the middle lateral grooves 40 are arranged close to the first surfaces 31 of the respective second protrusions 22. Specifically, a distance L10 in the tire circumferential direction from the groove centers of the opening ends 40a to the centers in the tire axial direction of the respective first surfaces 31, for example, is equal to or less than 30%, preferably equal to or less than 15%, of the pitch P1 of the protrusions 20. As a result, uneven wear near the middle lateral grooves 40 can be suppressed. On the other hand, from the viewpoint of ensuring the drainage performance of the middle lateral grooves 40, the distance L10 is preferably equal to or more than 30% of the groove width at the opening ends 40a of the respective middle lateral grooves 40.

Each of the middle lateral grooves 40 includes a first groove portion 46, a second groove portion 47 and a circumferential groove portion 48. The first groove portion 46 extends from the first shoulder circumferential groove 5 in the tire axial direction. The second groove portion 47 extends from the first crown circumferential groove 7 in the tire axial direction. An angle of the first groove portion 46 and an angle of the second groove portion 47 preferably range from 10 to 50 degrees, more preferably from 20 to 40 degrees, with respect to the tire axial direction. The circumferential groove portion 48 extends in the tire circumferential direction in communication with the first groove portion 46 and the second groove portion 47. An angle of the circumferential groove portion 48, for example, is equal to or less than 10 degrees, preferably equal to or less than 5 degrees, with respect to the tire circumferential direction. Such middle lateral grooves 40 can help to improve traction performance and cornering performance on snow.

Figure 7:
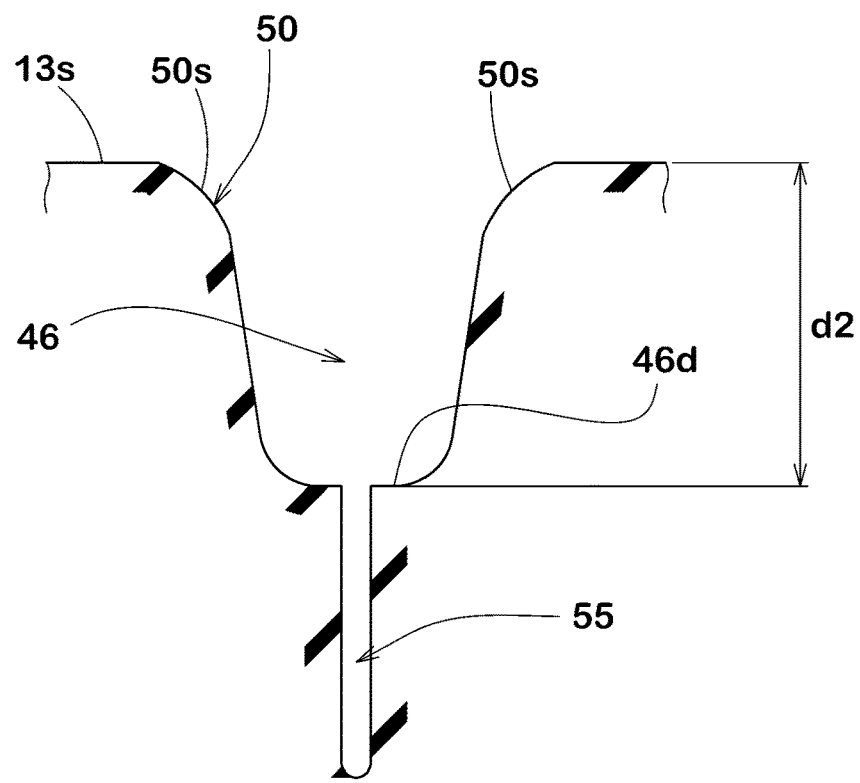
FIG. 7 is a cross-sectional view taken along the line B-B of FIG. 2.
Figure 8:
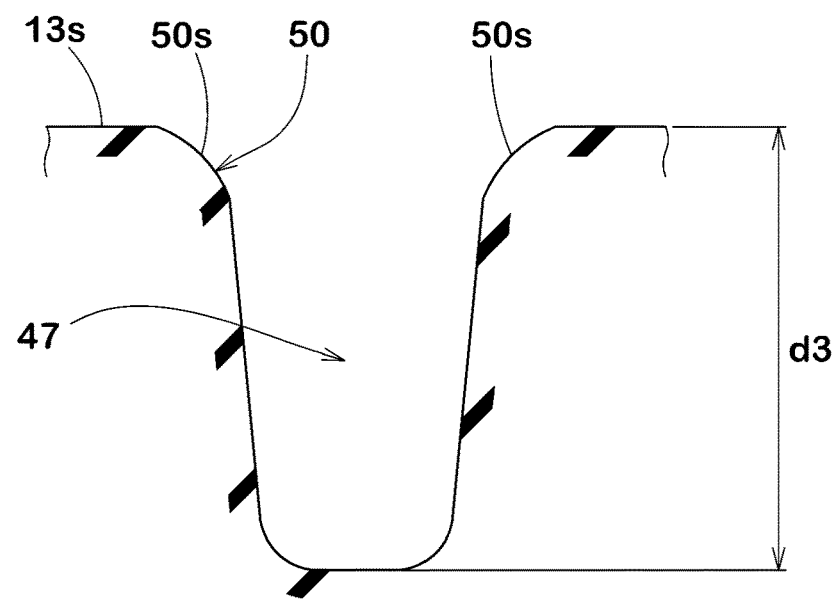
FIG. 8 is a cross-sectional view taken along the line C-C of FIG. 2.

In the present embodiment, the cross-sectional shape of the first groove portion 46 differs from that of the second groove portion 47. FIG. 7 illustrates a cross-sectional view taken along the line B-B of FIG. 2, as a cross section of the first groove portion 46. FIG. 8 is a cross-sectional view taken along the line C-C of FIG. 2 as a cross section of the second groove portion 47. As illustrated in FIG. 7 and FIG. 8, preferably, the first groove portion 46 and the second groove portion 47 are provided with chamfer portions 50. Each chamfer portion 50 includes an inclined surface 50s between the ground contact surface 13s of the land potion and the groove wall. Each inclined surface 50s of the present embodiment is slightly curved in a direction convex outward in the tire radial direction. Each inclined surface 50s may be plane, for example. The chamfered portions 50 can serve to equalize the ground contact pressure acting on the ground contact surface 13s and improve uneven wear resistance.

Preferably, the first groove portion 46 has a depth d2 that excludes a groove bottom sipe 55 (described later) ranging from 40% to 60% of the maximum depth of the first crown circumferential groove 7. Preferably, the second groove portion 47 has a depth d3, for example, ranging from 60% to 80% of the maximum depth of the first crown circumferential groove 7. Each middle lateral groove 40 having the first groove portion 46 and the second groove portion 47 can serve to improve steering stability and on-snow performance in a well-balanced manner.

The first groove portion 46 has the groove bottom sipe 55 that opens at a groove bottom 46d and extends inwardly in the tire radial direction. Such a groove bottom sipe 55 can facilitate the opening of the first groove portion 46 appropriately and help to improve on-snow performance.

As illustrated in FIG. 2, in the present embodiment, the middle lateral grooves 40 include first middle lateral grooves 41 including the first groove portions 46 and the second groove portions 47 which have the above-mentioned shapes, and second middle lateral grooves 42 including the first groove portion 46 and the second groove portion 47 which have the different shape from those of the first middle lateral grooves 41. The first groove portions 46 of the second middle lateral grooves 42 have a cross-sectional shape shown in FIG. 8, and the second groove portions 47 of the second middle lateral grooves 42 have a cross-sectional shape shown in FIG. 7. In addition, in the present embodiment, the first middle lateral grooves 41 and the second middle lateral grooves 42 are arranged alternately in the tire circumferential direction. By arranging the middle lateral grooves 40 in this way, the rigidity of the first middle land portion 13 can be made uniform and uneven wear resistance can be improved.

As illustrated in FIG. 2, the first middle land portion 13 is further provided with a plurality of first middle sipes 51, a plurality of second middle sipes 52 and a plurality of circumferential sipes 53. The first middle sipes 51 extend in the tire axial direction from the first shoulder circumferential groove 5 and have respective terminal ends 51a on the ground contact surface of the first middle land portion 13. The second middle sipes 52 extend in the tire axial direction from the first crown circumferential groove 7 and have respective terminal ends 52a on the ground contact surface of the first middle land portion 13. Each circumferential sipe 53 extends from one of the terminal ends 51a of the first middle sipes 51 to one of the terminal ends 52a of the second middle sipe 52 adjacent each other while passing the circumferential groove portion 48 of the first middle lateral groove 41 that is located between the adjacent terminal ends 51a and 52a. These various types of sipes can enhance traction and turning performance on snow while maintaining steering stability.

Each of the first and second middle sipes 51 and 52 is provided with one or more chamfer portions 58. Preferably, a chamfer width of the chamfer portions 58 of the first and second middle sipes 51 and 52 decreases toward a circumferential sipe 53 side. This can ensure a ground contact area in the center of the first middle land portion 13 and can maintain steering stability.

In a tread plan view, at least one of the protrusions 20 (e.g., one of the second protrusions 22 in this embodiment) preferably overlaps at least a part of an area in which an end portion on the first crown circumferential groove 7 side of one of the second middle sipes 52 is extended inwardly in parallel with the tire axial direction. Such an arrangement of the second middle sipes 52 can enhance steering stability and uneven wear resistance performance.

Although one or more embodiments of the tire according to the present disclosure have been described in detail above, the present disclosure is not limited to the specific embodiments described above and may be embodied in various ways.

[Additional Note]

The present disclosure includes the following aspects.

[Note 1]

A tire comprising:
  a tread portion comprising at least one circumferential groove extending continuously in a tire circumferential direction, wherein
  the at least one circumferential groove comprises a groove bottom having a plurality of protrusions projecting in a tire radial direction,
  each of the plurality of protrusions has a longitudinally elongated shape with a width in a tire axial direction and a length in the tire circumferential direction that is greater than the width, and
  each of the plurality of protrusions comprises a tapered portion whose width decreases in the tire circumferential direction.

[Note 2]

The tire according to note 1, wherein
  the at least one circumferential groove comprises a first groove wall and a second groove wall,
  the plurality of protrusions comprises a plurality of first protrusions arranged on a first groove wall side, and a plurality of second protrusions arranged on a second groove wall side,
  the tapered portion of each of the plurality of first protrusions has a width decreasing toward a first side in the tire circumferential direction, and
  the tapered portion of each of the plurality of second protrusions has a width decreasing toward a second side in the tire circumferential direction that is opposite to the first side.

[Note 3]

The tire according to note 2, wherein
  in a tread plan view, each tapered portion is formed between a first side surface extending along the tire circumferential direction and a second side surface inclined at a larger angle than that of the first side surface with respect to the tire circumferential direction.

[Note 4]
The tire according to note 3, wherein
the first side surface is located on a groove centerline side of the circumferential groove with respect to the second side surface.

[Note 5]
The tire according to any one of notes 1 to 4, wherein
the plurality of protrusions is arranged at a constant pitch in the tire circumferential direction, and
a length in the tire circumferential direction of each protrusion ranges from 40% to 60% of the pitch.

[Note 6]
The tire according to any one of notes 1 to 5, wherein
a maximum height in the tire radial direction of the plurality of protrusions is equal to or less than 20% of a maximum groove depth of the at least one circumferential groove.

[Note 7]
The tire according to any one of notes 1 to 6, wherein
in a tread plan view, each tapered portion is formed between a first side surface extending along the tire circumferential direction and a second side surface inclined at a larger angle than that of the first side surface with respect to the tire circumferential direction, and
an angle between the first side surface and the second side surface is equal to or less than 30 degrees.

The invention claimed is:

1. A tire comprising:
a tread portion provided with a circumferential groove extending continuously in a tire circumferential direction,
the circumferential groove having a first groove side wall, a second groove side wall and a groove bottom therebetween,
wherein
the groove bottom of the circumferential groove is provided with protrusions projecting outwardly in a tire radial direction,
each of the protrusions has a longitudinally elongated shape with a width in a tire axial direction and a length in the tire circumferential direction that is greater than the width,
the protrusions include first protrusions and second protrusions,
the first protrusions are located closer to the first groove side wall than the second protrusions, and thereby, the second protrusions are located closer to the second groove side wall than the first protrusions,
each of the first protrusions and the second protrusions has a first circumferential end on one side in the tire circumferential direction and a second circumferential end on the other side in the tire circumferential direction, and
the width in the tire axial direction of each of the first protrusions gradually decreases from the second circumferential end to the first circumferential end, whereas the width in the tire axial direction of each of the second protrusions gradually decreases from the first circumferential end to the second circumferential end.

2. The tire according to claim 1, wherein
the protrusions are arranged at a constant pitch in the tire circumferential direction, and
the length in the tire circumferential direction of each protrusion ranges from 40% to 60% of the pitch.

3. The tire according to claim 1, wherein a maximum height in the tire radial direction of each of the protrusions is equal to or less than 20% of a maximum groove depth of the circumferential groove.

4. The tire according to claim 1, wherein the first protrusions are spaced in the tire circumferential direction.

5. The tire according to claim 4, wherein the second protrusions are spaced in the tire circumferential direction.

6. The tire according to claim 5, wherein the first protrusions and the second protrusion are arranged alternately in the tire circumferential direction and staggered about the groove centerline.

7. The tire according to claim 6, wherein the width in the tire axial direction of each of the first and second protrusions ranges from 30% to 70% of a maximum groove width of the circumferential groove.

8. The tire according to claim 6, wherein circumferential extents of the first protrusions and circumferential extents of the second protrusion do not overlap with each other.

9. The tire according to claim 8, wherein the width in the tire axial direction of each of the first and second protrusions ranges from 30% to 70% of a maximum groove width of the circumferential groove.

10. The tire according to claim 1, wherein in a tread plan view, each of the protrusions has a first side surface extending along the tire circumferential direction and a second side surface extending along the tire circumferential direction while inclining at a larger angle than that of the first side surface with respect to the tire circumferential direction.

11. The tire according to claim 10, wherein in each of the protrusions, the first side surface is located closer to a groove centerline of the circumferential groove than the second side surface.

12. The tire according to claim 10, wherein in the tread plan view, an angle between the first side surface and the second side surface is equal to or less than 30 degrees.

13. The tire according to claim 10, wherein the first side surface extending in parallel with the tire circumferential direction.

* * * * *